United States Patent [19]

Schmid et al.

[11] Patent Number: 5,693,135
[45] Date of Patent: *Dec. 2, 1997

[54] INTERFERENCE PIGMENTS CONTAINING REDUCED TITANIUM OXIDE LAYERS FOR PREPARING FORGERYPROOF DOCUMENTS AND PACKAGING

[75] Inventors: Raimund Schmid, Neustadt; Norbert Mronga, Dossenheim; Claus Kaliba, Schifferstadt; Werner Ostertag, Grünstadt; Helmut Schmidt, Osthofen, all of Germany

[73] Assignee: BASF Aktiengesellschaft, Ludwigshafen, Germany

[*] Notice: The term of this patent shall not extend beyond the expiration date of Pat. No. 5,573,584.

[21] Appl. No.: 737,922
[22] PCT Filed: May 17, 1995
[86] PCT No.: PCT/EP95/01871
§ 371 Date: Dec. 2, 1996
§ 102(e) Date: Dec. 2, 1996
[87] PCT Pub. No.: WO95/33009
PCT Pub. Date: Dec. 7, 1995

[30] Foreign Application Priority Data

Jun. 1, 1994 [DE] Germany ............... 44 19 089.1

[51] Int. Cl.$^6$ ............... C04B 14/20; C09C 1/62
[52] U.S. Cl. ............... 106/417; 106/415; 106/436; 101/491; 162/140; 162/181.4
[58] Field of Search ............... 106/415, 417, 106/436; 162/181.1, 181.4, 140; 101/491

[56] References Cited

U.S. PATENT DOCUMENTS

| 3,087,827 | 4/1963 | Kleuke et al. | |
|---|---|---|---|
| 4,434,010 | 2/1984 | Ash. | |
| 5,059,245 | 10/1991 | Phillips et al. | |
| 5,364,467 | 11/1994 | Schmid et al. | 106/415 |
| 5,540,769 | 7/1996 | Franz et al. | 106/415 |
| 5,573,584 | 11/1996 | Ostertag et al. | 106/415 |

FOREIGN PATENT DOCUMENTS

| 164653 | 9/1983 | Japan. |
| 126468 | 7/1984 | Japan. |
| 184570 | 9/1985 | Japan. |

OTHER PUBLICATIONS

Kirk–Othmer, "Encyclopedia of Chemical Technology", Third edition, vol. 17, John Wiley & Sons, N.Y., p. 807 1982 (no month).

Primary Examiner—Michael Marcheschi
Attorney, Agent, or Firm—Oblon, Spivak, McClelland, Maier & Neustadt, P.C.

[57] ABSTRACT

Interference pigments based on titanium dioxide-coated silicatic platelets which have been heated in a reducing atmosphere are useful for producing forgeryproof documents and packaging.

4 Claims, No Drawings

INTERFERENCE PIGMENTS CONTAINING REDUCED TITANIUM OXIDE LAYERS FOR PREPARING FORGERYPROOF DOCUMENTS AND PACKAGING

This application is a 371 of International Application No. PCT/EP 95/01871, filed May 17, 1995, published as WO/95/33009 Dec. 7, 1995.

BACKGROUND OF THE INVENTION

1. Field of the Invention

The present invention relates to the use of specific interference pigments based on titanium dioxide-coated silicatic platelets which have been heated in a reducing atmosphere, in combination with scattering color pigments or scattering white pigments, for preparing forgeryproof documents and packaging.

2. Discussion of the Background

The forgeryproofing of documents such as paper money, postage stamps, checks, tax stamps, checkcards, rail or air tickets, credit cards, telephone cards, lottery tickets, share certificates, gift vouchers, passes or identity cards is becoming more and more important in view of the introduction of evermore powerful color copiers and the attendant scope for forgery. The same is true of valuable packaging.

Forgeryproofness has in the past been pursued in various ways. For instance, the originals were marked using magnetic pigments, or fluorescent dyes. However, these markings have the disadvantage that their presence is not immediately recognizable visually; they can only be detected using appropriate, more or less complex, reading apparatus. The same is true of marking with IR or UV dyes or pigments.

Greater interest therefore pertains to marks which are sufficiently reliably recognizable with the unaided, naked eye and make it easy to distinguish the copy from the original. In practice this kind of mark has taken the form of water marks—silvery bright metal strips which show up black in the copy owing to the total reflection of the light—or holograms. However, the disadvantage of these marks is that they are easy to imitate or, in the case of holograms, costly and prone to damage.

The most recent addition to the ways of marking authenticity is the use of simple interference pigments. However, applied atop a light-colored ground, interference pigments are virtually invisible, the exact field of the identifying mark is difficult to make out, and the markings are consequently easily overlooked.

Interference pigments in the conventional sense (described for example in U.S. Pat. No. 3,087,827 are plateletlike luster pigments consisting predominantly of a mica substrate coated with a layer of highly refractive material, eg. rutile, zirconium dioxide or tin dioxide, in a certain thickness (generally >50 nm) to form thin platelet colors. Interference pigments have to be applied in an oriented state. However, the intensity of the color of interference color pigments is low compared with that of scattering color pigments. They have an angle-dependent reflection maximum. Interference pigments of this type have for many years been used in cosmetics and plastics.

There have also been disclosed multi-layer pigments which exhibit a distinct angle-dependent color change and are produced by pulverizing thin film security devices—thin multi-layer films detached from the substrate (U.S. Pat. Nos. 4,434,010, 5,059,245). The optical principle underlying such pigments is that of the transmission filter. The sequence of layers making up such pigments typically includes 5 layers: a dielectric layer of low refractive index, eg. silicon dioxide, a semitransparent reflecting metal layer, eg. titanium, aluminum or chromium, a dielectric layer of low refractive index, eg. silicon dioxide, a highly reflecting opaque metal layer, eg. aluminum or titanium, a dielectric layer of low refractive index, eg. silicon dioxide, a semitransparent reflecting metal layer, eg. aluminum, chromium or titanium, and a dielectric layer of low refractive index., eg. silicon dioxide.

Pigments of this type have the disadvantage that they are costly, impossible to produce in large amounts, not stable to alkali and, what is more, usually do not have the desired acid fastness.

DE-A-42 41 753, an earlier patent document which was unpublished at the priority date of the present invention, describes interference pigments for forgeryproof documents which include at least one colorless, highly refractive metal oxide layer and a nonselectively absorbing metal and/or metal oxide or carbon layer but no reduced titanium dioxide layer.

SUMMARY OF THE INVENTION

It is an object of the present invention to provide further interference pigments which have advantageous properties for the field of the forgeryproof marking of documents and packaging.

We have found that this object is achieved by the use of interference pigments based on titanium dioxide-coated silicatic platelets which have been heated in a reducing atmosphere, in combination with scattering color pigments or scattering white pigments, for preparing forgeryproof, especially difficult- or impossible-to-copy, documents and packaging.

In a preferred embodiment of the use of the interference pigments, they are used in combination with scattering color pigments which are complementary in color to the reflection color of the interference pigments.

DETAILED DESCRIPTION OF PREFERRED EMBODIMENTS

Suitable plateletlike silicatic substrates for the interference pigments to be used according to the present invention include especially light-colored or white micas, particularly preferably flakes of preferably wet-ground muscovite. It is of course also possible to use other natural micas, such as phlogopite or biotite, artificial micas, talc and glass flakes.

The substrate particles are coated with a layer which consists essentially of titanium dioxide and may contain minor proportions (<5% by weight) of further, preferably colorless, metal oxides such as zirconium dioxide and tin dioxide.

Such pigments are common knowledge; cf. for example DE-A-14 67 468, DE-A-32 37 264 or DE-A-20 09 566. Titanium dioxide-coated mica platelets are also commercially available under the names Iriodin® (E. Merck, Darmstadt), Flonac® (Kemira Oy, Pori, Finland) or Mearlin® (Mearl Corporation, Ossining, N.Y.).

The thickness of the $TiO_2$ layer determines the hue and it generally ranges with the desired interference color from 20 to 200 nm, preferably from 40 to 160 nm.

The interference pigments to be used according to the present invention are obtained by heating the titanium dioxide-coated silicate platelets in the presence of one or more reducing gases.

Suitable reducing gases include in particular hydrogen and especially ammonia and also mixtures of these two gases which have preferably been diluted with an inert gas.

Suitable temperatures for this reducing treatment generally range from 500° to 1000° C., preferably from 600° to 800° C.

Depending on the reaction conditions (concentration and nature of the reducing gas, temperature, duration of the treatment) a multiplicity of oxidic and/or nitridic titanium compounds are obtained in which the titanium is in an oxidation state <4, for example lower titanium oxides, such as $Ti_3O_5$ and $Ti_2O_3$, up to TiO, titanium oxynitrides and even titanium nitride.

Such interference pigments and their production are known from JP-A-164 653/1983, 126 468/1984 and 184 570/1985 and also in particular from DE-A-34 33 657 and EP-A-332 071.

Of use for the present invention are in particular those interference pigments where the $TiO_2$ layer has not been completely reduced, ie. where titanium dioxide is still present alongside the reduced titanium compounds mentioned.

Particular preference is given to pigments which, based on the $TiO_2$ still present, have a reduced titanium compound content of from 0.1 to 50% by weight, especially from 0.1 to 10% by weight, ie. have only been reduced "lightly" or "particularly lightly".

With increasing reduction, the mass tone color of the pigments shifts toward the absorption color of the reduction products of titanium, which is why relatively strongly reduced pigments are suitable in particular for the blue to violet region.

Relatively lightly reduced pigments, in contrast, can be used to cover the entire range of hues. The pigments obtained have a strong luster and a pastellike color and on copying they give rise to conspicuous off-shade colors.

In addition, the pigments of the present invention are notable for light fastness.

The interference pigments to be used according to the present invention may additionally have a top layer of colorless or selectively absorbing metal oxide. Suitable metal oxides for this layer include for example titanium oxide, zirconium oxide, tin oxide, chromium oxide, iron oxide, aluminum oxide, silicon oxide or zinc oxide or mixtures thereof. This layer can be used to further modify the interference color of the pigment and, if colored oxides are used, additionally the mass tone color, too.

Preferably, however, the interference pigments to be used have no additional top layer.

The interference pigments to be used according to the present invention preferably have an average particle diameter (based on the largest particle diameter) of from 5 to 30 μm.

They are used in combination with scattering color pigments or scattering white pigments.

Scattering pigments for the purposes of the present invention are pigmentary colorants which work chiefly by selective absorption or diffuse scattering. As scattering color pigments it is also possible to use scattering white pigments surface-colored with transparent colorants.

The scattering color pigments used are preferably complementary in color to the reflection color of the interference pigments.

Suitable scattering color pigments include not only inorganic but also organic pigments having a refractive index n greater than 1.65.

Examples of inorganic pigments include iron oxides, bismuth vanadate, colored spinels and nickel titanium yellow.

Examples of organic pigments are monoazo pigments (ie. products derived from acetoacetarylide derivates or from β-naphthol derivatives), laked monoazodyes, such as laked β-hydroxynaphthoic acid dyes, disazo pigments, fused disazo pigments, isoindoline derivatives, derivatives of naphthalene- or perylene-tetracarboxylic acid, anthraquinone pigments, thioindigo derivatives, azomethine derivatives, quinacridones, dioxazines, pyrazoloquinazolones, phthalocyanine pigments and laked basic dyes, such as laked triarylmethane dyes, provided they have a refractive index n greater than 1.65. Otherwise these pigments are suitable for the surface-coloring of scattering white pigments.

Titanium dioxide in particular is a suitable scattering white pigment.

The use of the interference pigments according to the present invention has the following advantages for visual perception. First, the pigmented marking is easy to see from every angle, even against a transparent or light-colored ground, since the reflected interference color can be seen significantly more clearly and with much higher intensity through the coating of the present invention. Furthermore, copying, even with powerful color copiers, gives rise to off-shade colors.

On copying for example a document marked with a violet interference pigment and a scattering white pigment (eg. rutile), the interference pigment with the violet reflection color will appear yellow against the white scattering background. If the background is pigmented with iron red, cobalt spinel blue or halogenated phthalocyanine instead of with titanium dioxide, the color copy will show brownish, greenish or yellow-green off-shade colors.

The same result is obtained on surface-coloring the scattering white pigment with dyes, for example paper dyes, in red, blue or yellow.

It is particularly advantageous to combine the interference pigments of the present invention with scattering color pigments which are complementary in color to the reflection color of the interference pigments. If, for example, an interference pigment having a bluish violet reflection color is used to apply a pattern atop a ground colored with a pigment that scatters yellow light, the pattern will not show up in a color copy, since it is reproduced with a greenish yellow off-shade color.

The effects mentioned are particularly conspicuous, ie. provide the best protection against forgery, when the documents to be forgeryproofed are prepared with the interference pigments ending up at the very top, ie. printed atop a printed ground of scattering color or white pigment, but are still noticeable—albeit not as powerfully—when the interference pigment and the scattering color or white pigment are mixed and then printed together.

The interference pigments of the present invention are advantageously applied via the step of making a printing ink and subsequently applying this printing ink using conventional printing processes, eg. screen printing, intaglio printing, bronze printing, flexographic printing or offset printing.

The pigments are also with particular advantage incorporable into coatings which are used for overcoating prints.

Finally, a further advantageous application is the incorporation into plastics films which, if desired, are laminated onto paper.

EXAMPLES

Preparation and use of interference pigments according to the present invention

Example 1

In a mechanically rotatable single-neck quartz round-bottom flask equipped with a gas inlet and outlet in the axis of rotation and enclosed by a clamshell oven, 15 g of a TiO$_2$-coated mica pigment having a violet interference color (Iriodin® 219 rutile pearl violet; Merck) were initially inertized for 2 h with 15 l/h of nitrogen and then heated to 700° C. Then 2 l/h of ammonia were mixed into the inert gas. After 2 h the supply of ammonia was terminated and the heating was switched off. During the cooling down to room temperature, flushing with nitrogen was continued.

The pigment thus produced had a slightly violet color.

To convert it into a screen printing ink, 7.5 g of the pigment were stirred into 92.5 g of a commercial binder solution (composition: copolymer based on vinyl chloride and vinyl isobutyl ether = Laroflex® MP 45/acetate/aliphatics).

This ink was then screen-printed using a commercial screen printing machine (screen mesh size 112 μm) in a thickness of 45 μm onto a resin-coated, yellow paper uniformly printed with a printing ink containing bismuth vanadate, and air-dried.

The printed feature was distinctly visible on the yellow ground, even at fine lines.

In the color copy, the feature disappeared; only the yellow ground was visible.

Printing the feature onto the yellow paper using the printing ink containing the unreduced starting pigment made it virtually invisible, even in the original.

In addition, the feature was printed with the printing ink of the present invention onto resin-coated, white, TiO$_2$-coated paper. At the luster angle, the feature appeared in the violet reflection color, but away from the luster angle it had a yellowish gray tone.

A color copy reproduced the feature in lemon yellow.

Example 2

Example 1 was repeated using 15 g of a TiO$_2$-coated mica pigment with a blue interference color (Iriodin® 221 rutile fine blue; Merck), inertizing with 10 l/h of nitrogen and heating to 700° C. The subsequent reduction, again over two hours Was carried out with a mixture of 5 l/h of nitrogen and 5 l/h of ammonia.

The pigment obtained had a pale blue color and was converted into a screen printing ink, and screen printed, as described in Example 1.

On resin-coated, white, TiO$_2$-coated paper, the feature had a blue reflection color at the luster angle and a yellowish gray tone away from the luster angle.

A color copy reproduced the feature with an intensive yellow off-shade color.

Printed onto yellow paper, the feature was distinctly visible even at fine lines, whereas it became invisible in the color copy.

We claim:

1. A process for preparing forgeryproof documents and packaging, comprising preparing documents and packaging by applying thereto interference pigments based on titanium dioxide-coated silicatic platelets which have been heated in a reducing atmosphere, in combination with scattering color pigments or with scattering white pigments.

2. The process of claim 1, wherein the titanium dioxide-coated silicatic platelets have been heated in the presence of ammonia, hydrogen or a mixture thereof.

3. The process of claim 1, wherein the titanium dioxide-coated silicatic platelets have been heated at a temperature from 500° to 1000° C.

4. The process of claim 1, wherein the scattering color pigments are complementary in color to a reflection color of the interference pigments.

* * * * *